United States Patent [19]

Vellinga

[11] Patent Number: 5,565,098
[45] Date of Patent: Oct. 15, 1996

[54] REACTOR FOR THE BIOLOGICAL TREATMENT OF WATER

[75] Inventor: Sjoerd H. J. Vellinga, Tjalleberd, Netherlands

[73] Assignee: Paques B.V., Balk, Netherlands

[21] Appl. No.: 335,708

[22] PCT Filed: Jun. 3, 1993

[86] PCT No.: PCT/NL93/00114

§ 371 Date: Nov. 10, 1994

§ 102(e) Date: Nov. 10, 1994

[87] PCT Pub. No.: WO93/24417

PCT Pub. Date: Dec. 9, 1993

[30] Foreign Application Priority Data

Jun. 3, 1992 [NL] Netherlands ............... 9200975

[51] Int. Cl.$^6$ ............... C02F 3/28; C02F 3/22; B01D 19/00
[52] U.S. Cl. ............... 210/188; 210/195.3; 210/197; 210/220; 210/255; 210/262; 210/512.1
[58] Field of Search ............... 210/623, 624, 210/629, 801, 803, 188, 195.3, 197, 218, 220, 255, 262, 512.1, 523

[56] References Cited

U.S. PATENT DOCUMENTS

| | | | |
|---|---|---|---|
| 3,910,838 | 10/1975 | Kaelin | 210/629 |
| 4,357,242 | 11/1982 | Chandler | 210/801 |
| 4,609,460 | 9/1986 | Vellinga | 210/188 |
| 4,707,252 | 11/1987 | Durot et al. | 210/151 |
| 4,759,854 | 7/1988 | Wilson | 210/801 |
| 4,818,393 | 4/1989 | Durot et al. | 210/197 |
| 4,948,518 | 8/1990 | Turgay | 210/803 |
| 4,950,396 | 8/1990 | Scaar et al. | 210/255 |
| 5,344,563 | 9/1994 | Noyes | 210/624 |
| 5,407,584 | 4/1995 | Broussard, Sr. | 210/512.1 |
| 5,441,634 | 8/1995 | Edwards | 210/629 |

FOREIGN PATENT DOCUMENTS 53-111654 9/1978 Japan ............... 210/803

*Primary Examiner*—Peter A. Hruskoci
*Assistant Examiner*—Theodore M. Green
*Attorney, Agent, or Firm*—Young & Thompson

[57] ABSTRACT

A reactor for the biological treatment of water comprises a reactor vessel (1), a fermentation chamber (3) bounded in the vessel, inlets (10) for introducing influent into the fermentation chamber, a settling chamber (4) above the top boundary (2) of the fermentation chamber (3), for separating out sludge from treated water, a downer (5) extending downwards from the settling chamber through the fermentation chamber, for returning separated-out sludge to the fermentation chamber (3), and an outlet (11) for discharging effluent from the settling chamber. In order to improve and accelerate the separation of sludge from effluent in a simple manner, at least one supply line (8a, 9a, 17) opens out tangentially into the settling chamber. A whirlpool is produced in the settling chamber by the supply line.

12 Claims, 4 Drawing Sheets

REACTOR FOR THE BIOLOGICAL TREATMENT OF WATER

FIELD OF THE INVENTION

The invention relates to a reactor for the biological treatment of water, comprising a reactor vessel, a fermentation chamber bounded in said vessel, means for introducing influent into the fermentation chamber, a settling chamber above the top boundary of the fermentation chamber, for separating out sludge from treated water, a downer extending downwards from the settling chamber through the fermentation chamber, for returning separated-out sludge to the fermentation chamber, and means for discharging effluent from the settling chamber.

BACKGROUND OF THE INVENTION

Such reactors are known for both aerobic and anaerobic treatment of water. An example of an embodiment for anaerobic treatment is described in U.S. Pat. No. 4,609,460.

A driving force for the downward flow of recirculation water and sludge is obtained by producing a gas lift effect in such a treatment (in which case the gas-containing liquid outside the downer is lighter than the non-gas-containing liquid in the downer).

SUMMARY OF THE INVENTION

The object of the invention is to provide a simple way of improving the separation of sludge from effluent and also the circulation in the reactor.

According to the invention, for this purpose the reactor is characterised in that at least one liquid and/or gas supply line opens out in the settling chamber by way of a tangential discharge end, for producing a whirlpool in said settling chamber.

SUMMARY OF THE INVENTION

The whirlpool effect arising through the tangential supply of gas into the settling chamber gives an additional driving force to the downward flow of separated-out sludge and recirculation water. The sludge separation itself is improved.

Where the reactor is intended for anaerobic water purification, the supply line opening out tangentially into the settling chamber is a pipe for liquid and biogas. In that case it is connected to the fermentation chamber.

Where the reactor is intended for aerobic water purification, the supply line opening out tangentially into the settling chamber is an air or oxygen pipe.

The gas inlet line opening out into the settling chamber can be situated with its outlet end in a space which is separated by a cylindrical partition from the tangential inlet of the effluent discharge means.

An additional improvement of the downward flow in the downer can also be achieved if the means for introducing influent at least partially consist of one or more pipes opening tangentially downwards into the bottom part of the downer.

In order to prevent short-circuit currents in the bottom section of the reactor and to fluidise the bottom bed on the bottom, a number of gas inlet pipes can open out Just above the bottom of the fermentation chamber. In that case the whirlpool effect and the recirculation can also be adjusted to some extent with the influent introduction.

In the case of anaerobic purification, the settling in the settling chamber can be hampered by gas bubbles which occur in the case of oversaturation of (carbon dioxide) gas in the liquid/sludge mixture leaving the fermentation chamber. In order to solve this problem, the reactor can be provided with a gas stripper in the form of one or more cascade chambers, into which the liquid/sludge mixture to be supplied to the settling chamber is introduced, and out of which the liquid/sludge mixture flows through a tangential outlet into the settling chamber.

The cascade chambers are preferably fitted in the annular space between the cylindrical reactor wall and a cylindrical boundary wall of the settling chamber. A cyclone can be connected upstream of the cascade chambers, in order to separate out the coarse gas.

Of course, the place where effluent is discharged must lie at a good distance from the place where the liquid/sludge mixture is supplied tangentially to the settling chamber. The tangential outlet of the cascade chambers and the inlet of the effluent outlet will therefore lie at an angular distance of little less than 360°, viewed in the whirlpool direction.

BRIEF DESCRIPTION OF THE DRAWINGS

The invention will now be explained in greater detail with reference to the figures, in which examples of a reactor for anaerobic purification of effluent are shown.

DETAILED DESCRIPTION OF THE INVENTION

Figure 1:
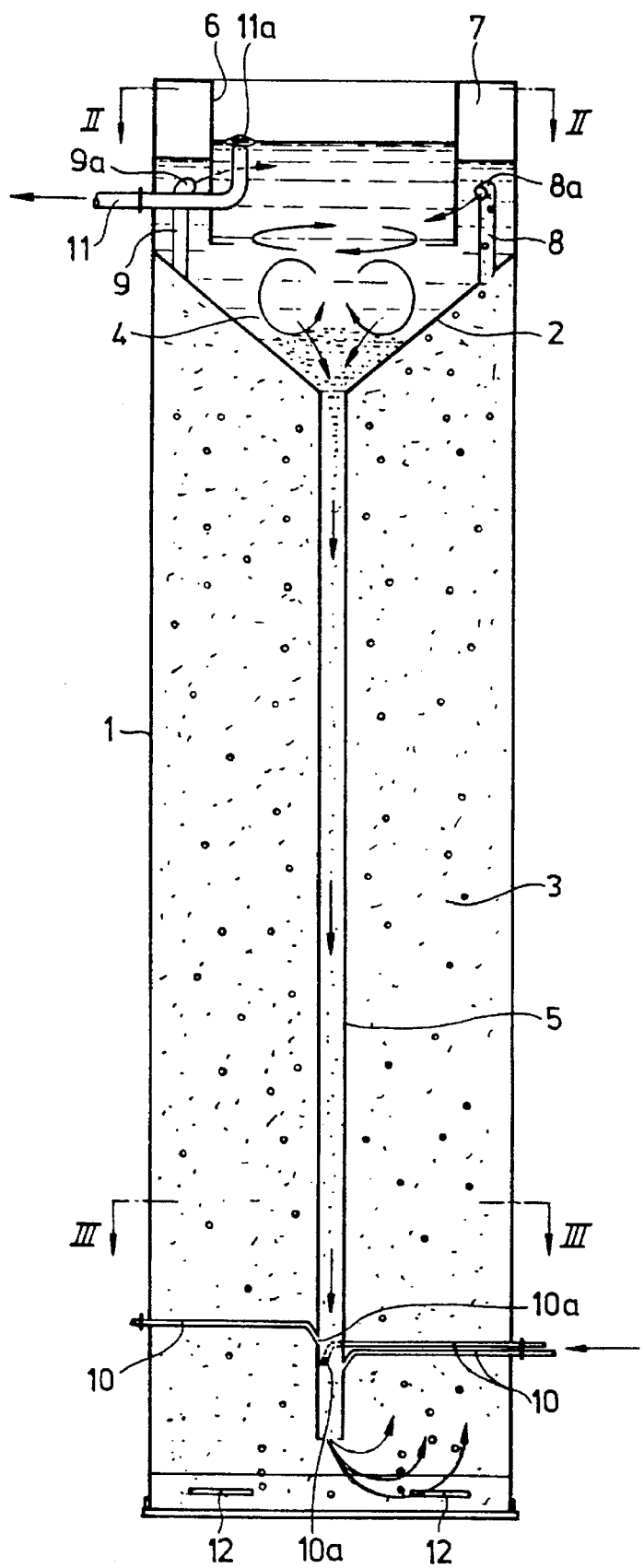
FIG. 1 shows a longitudinal section of the reactor (see I—I in FIG. 2).

The reactor shown comprises a relatively high cylindrical reactor vessel 1, which is divided by a conical wall 2 into a fermentation chamber 3 and a settling chamber 4. A downer 5 extends from the downward-directed tip of the conical wall 2 through the fermentation chamber 3, which downer opens out at some distance above the bottom of said chamber.

A cylindrical partition 6 is provided in the settling chamber 4, which partition with the outside wall of the vessel I bounds a cylindrical space 7 into which pipes 8, 9 open out with a tangential discharge end 8a, 9a respectively. Each of said pipes 8, 9 is in communication with the fermentation chamber 3 by way of an opening in the conical wall 2.

Pipes 10 for the supply of water to be treated (influent) open out into the bottom part of the downer 5, the discharge end 10a of said pipes 10 being directed tangentially and slightly downwards relative to the downer.

A pipe 11 for the discharge of treated water (effluent) extends from an inlet 11a running tangentially inside the space bounded by the partition 6 to the exterior of the vessel 1.

The device works as follows:

During the time in which the water to be treated is in the fermentation chamber 3, biogas (in particular methane) is formed. As a result of the continuous or batchwise supply of influent through the pipes 10, liquid and biogas will flow through the pipes 8 and 9 into the settling chamber 4, where sludge and water are separated, and where biogas separates out from the liquid.

A mixture of recirculation water and sludge flows back through the downer 5 to the bottom of the fermentation chamber 3. Due to the absence of gas, this mixture is heavier than the gas-containing mixture of sludge and water present at the outside of the downer 5. The gas lift effect arising through this weight difference promotes the circulation in the reactor.

Since the pipes 8 and 9 have tangential outflow openings 8a, 9a respectively, a whirlpool is produced in the settling chamber, which whirlpool further reinforces and accelerates the separation of sludge and the circulation of the reactor.

As a result of friction, the flow velocity near the top surface of the wall 2 is lower than it is at a distance above said surface. In addition to the whirlpool flow in horizontal planes (see the top two curved arrows in FIG. 1), this causes circulation flows in vertical planes (see the bottom two curved arrows in FIG. 2), which promotes the settling near the top end of the downer 5.

The downward flow of sludge and recirculation water in the downer is also promoted by the tangentially downward running position of the outflow opening 10a of the influent pipes 10.

The purified water (effluent) passes through the tangential inlet 11a into the pipe 11 and is discharged through said pipe.

As a result of the infeed of gas (in the case of an anaerobic reactor: biogas) into the sludge bed on the bottom of the reactor through the pipes 12, the sludge bed is fluidised and short-circuit currents are prevented.

The invention is not restricted to the anaerobic reactor described, but can also be applied to aerobic reactors. In that case the whirlpool effect will be produced by air or oxygen which is conveyed through the pipes 8 and 9 into the settling chamber.

The invention leads to an improved and accelerated separation of sludge.

Figure 4:
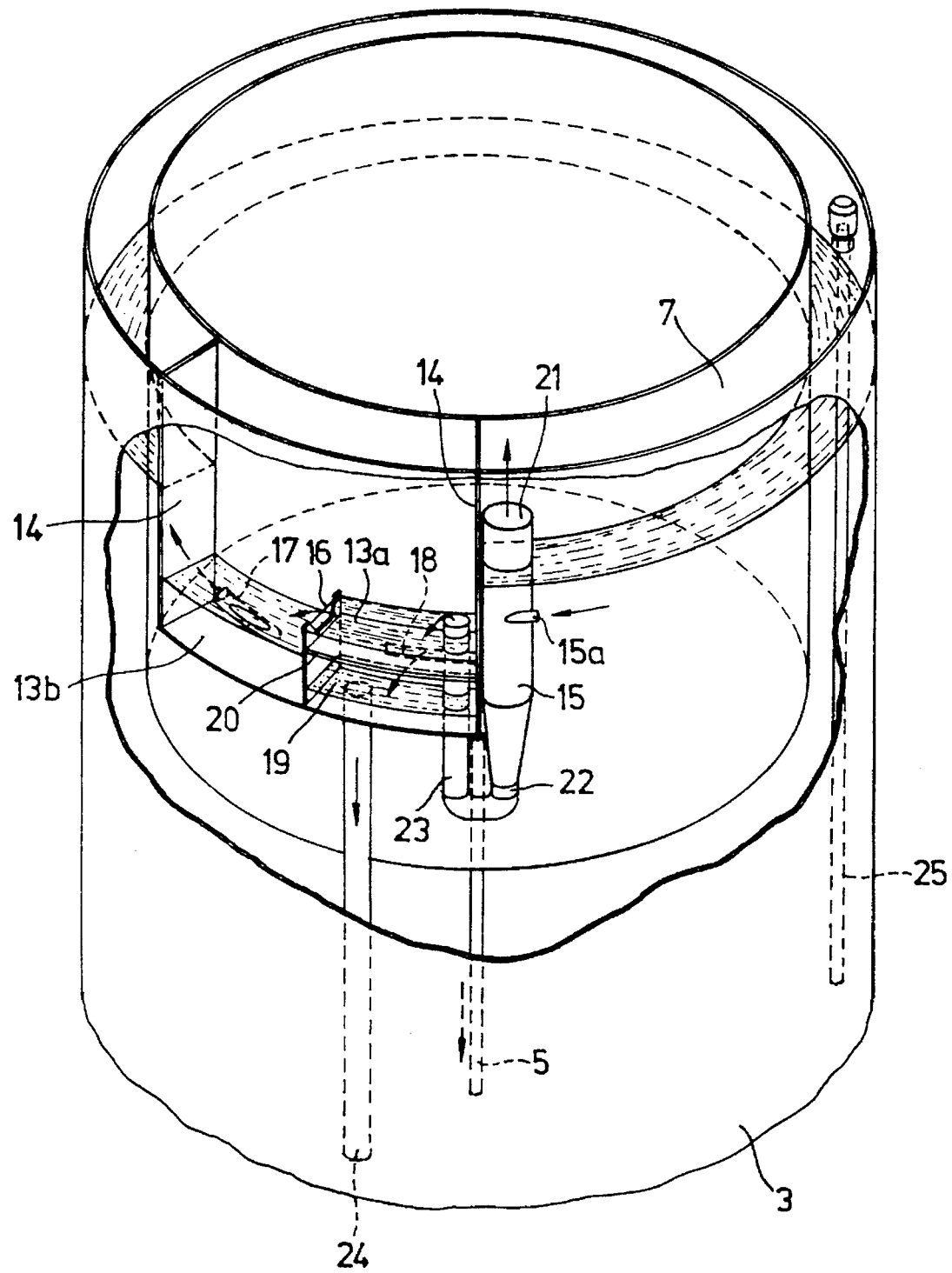
FIG. 4 shows a perspective view of a second embodiment of the whirlpool reactor according to the invention, in which a part of the cylindrical reactor wall is cut away.
Figure 5:
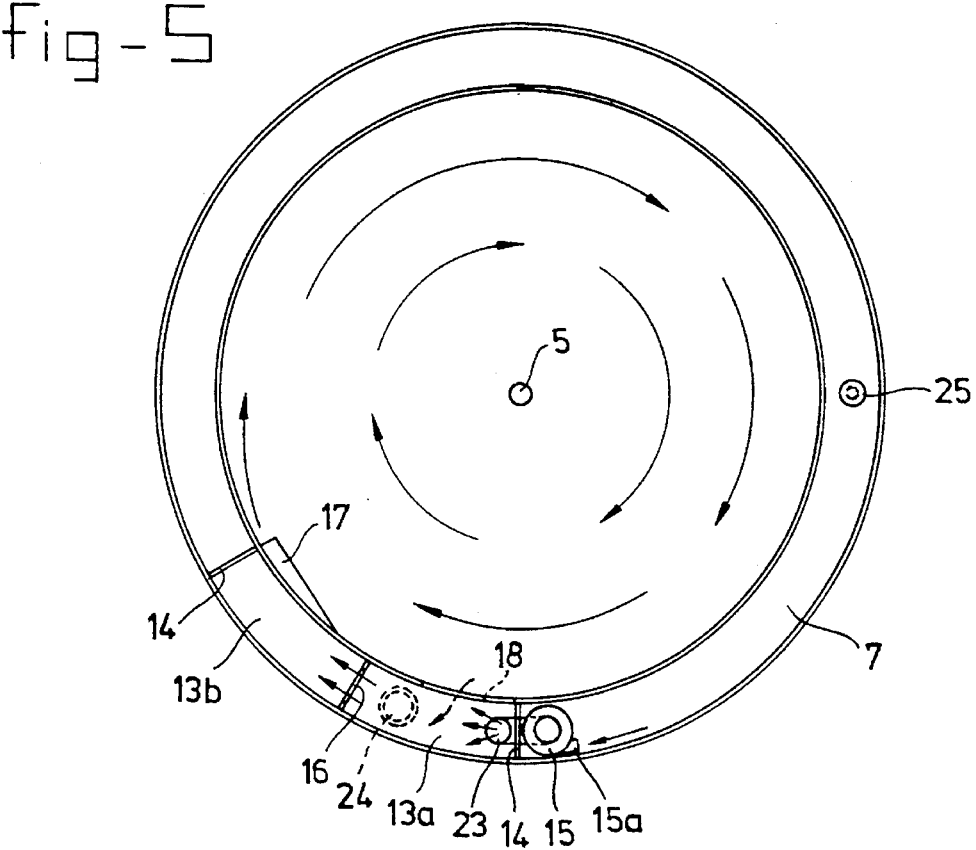
FIG. 5 shows a cross-section near the top edge of the reactor according to FIG. 4.
Figure 6:
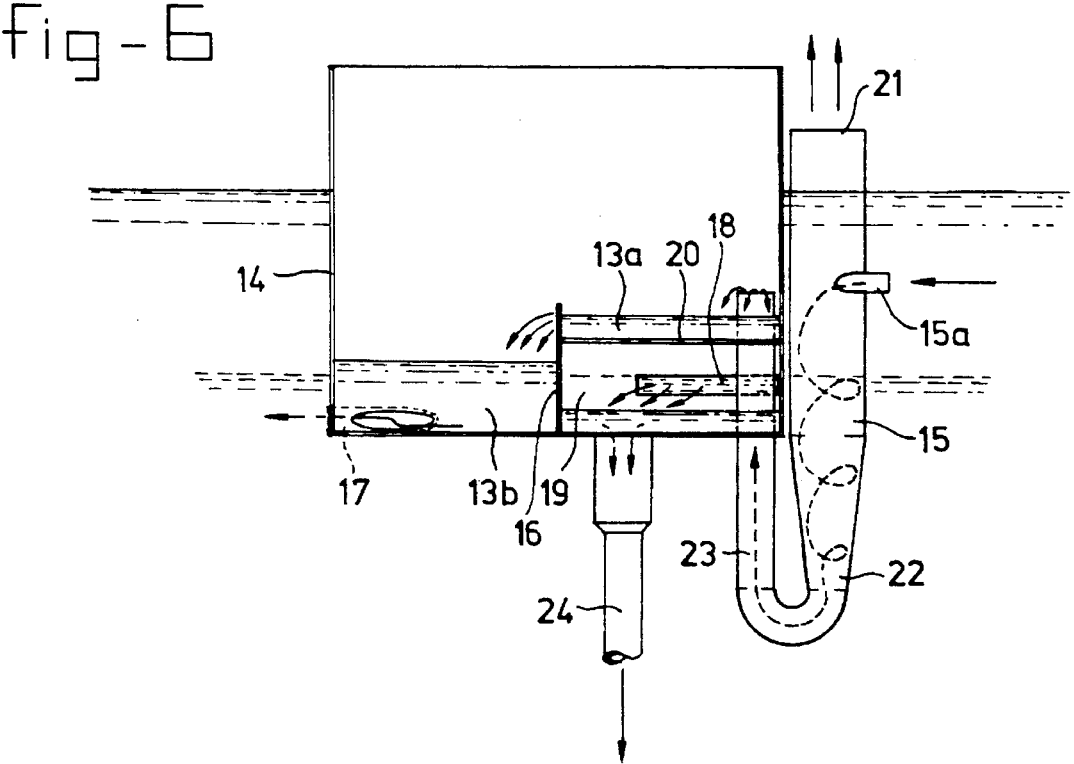
FIG. 6 shows a longitudinal section of the cascade chambers of the device according to FIGS. 4 and 5.

The alternative embodiment according to FIGS. 4, 5 and 6 gives a solution to the problem of small gas bubbles arising through oversaturation of carbon dioxide in the liquid in the settling chamber, and impeding the settling of sludge. For this purpose, this carbon dioxide is for the most part stripped out of the liquid before the liquid is introduced tangentially into the settling chamber.

In the annular space 7, two cascade chambers 13a, 13b are separated by walls 14 from the remainder of the annular space 7. A cyclone 15 is connected upstream of said cascade chambers. The overflow wall 16 is placed between the chambers 13a and 13b. A pipe 17 extends tangentially from the inward facing side wall of the cascade chamber 13b, for the tangential supply of liquid into the settling chamber 4, which liquid has the carbon dioxide stripped from it. An opening 18 in the inside wall of the annular space 7 admits effluent from the settling chamber 2 into a chamber 19 below the bottom 20 of the first cascade chamber 13a. An effluent discharge pipe 24 (comparable to the pipe 11 in FIGS. 1 and 2) extends downwards from the bottom of the chamber 19. The top end 21 of the cyclone 14 is the discharge outlet for coarse gas above the liquid in the annular space 7. The liquid discharge outlet 22 at the bottom end of the cyclone is connected to a pipe 23 which extends upwards in the first cascade chamber 13a, and the outlet of which projects beyond the surface of the liquid in said chamber 13a, so that a cascade of liquid can flow into the cascade chamber 13a.

The mixture of liquid, sludge and gas which has passed into the annular space flows through the inlet 15a into the cyclone 15, where the coarse gas is separated from the liquid and leaves the cyclone at the top end 21. The liquid/sludge mixture with oversaturated carbon dioxide dissolved therein leaves the cyclone at 22 and flows through the top end of the pipe 23 into the first cascade chamber 13a, and then over the top edge of the wall 16 into the second cascade chamber 13b. The oversaturated carbon dioxide is released as a result of the cascade formation and passes into the air above the surface of the liquid in the annular space 7, where together with the carbon dioxide separated out by the cyclone it is extracted through a gas discharge pipe 25.

Figure 2:
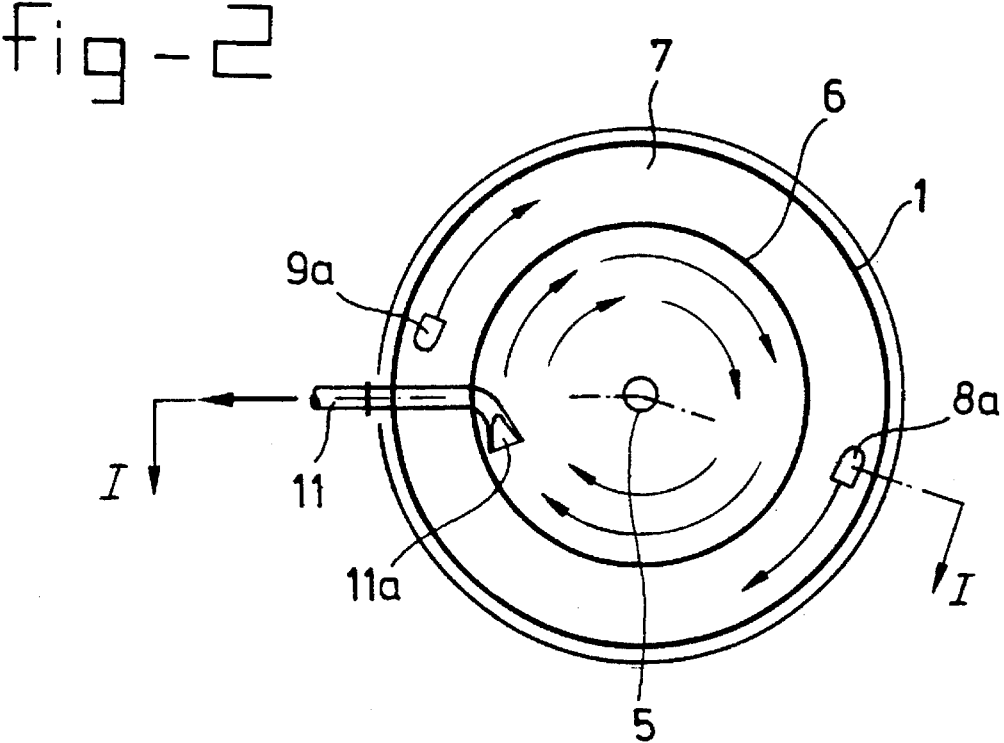
FIG. 2 shows a cross-section along the line II—II in FIG. 1.
Figure 3:
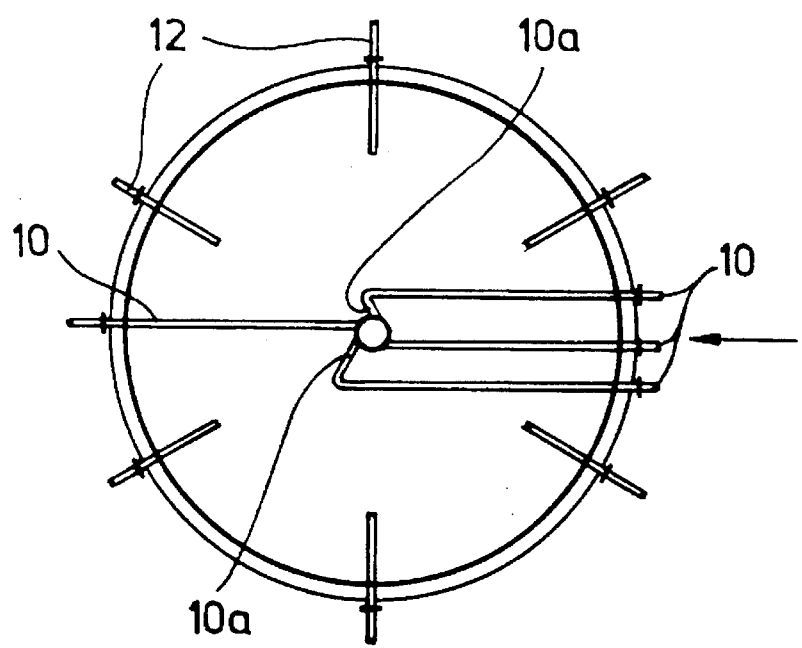
FIG. 3 shows a cross-section along the line III—III in FIG. 1.

The liquid which has reached the settler 2 through the tangential pipe 17 has most of the dissolved carbon dioxide removed from it and will be conveyed in a whirlpool flow, in the manner described with reference to the embodiment according to FIGS. 1 and 2, without carbon dioxide bubbles having an impeding effect. Sludge settlement near the inlet of the downer 5 is promoted and the liquid which is high in sludge and low in gas flows through the downer to the underside of the fermentation chamber 3.

A cover (not shown) is placed on the reactor vessel.

Due to the fact that the opening 18—viewed in the direction of rotation of the whirlpool—is a little less than 360° away from the tangential outlet 17, the sludge has sufficient opportunity to settle before the effluent is discharged through opening 18, chamber 19 and pipe 24.

I claim:

1. Reactor for the biological treatment of water comprising a reactor vessel, a fermentation chamber bounded in said vessel, means for introducing influent into the fermentation chamber, a settling chamber disposed above a top boundary of the fermentation chamber, for separating out sludge from treated water, said settling chamber having an outer boundary formed as a body of revolution, at least one supply line having a discharge end opening into the settling chamber, a downer extending downwards from the settling chamber through the fermentation chamber for returning separated sludge to the fermentation chamber, and means for discharging effluent from the settling chamber, said discharge end of the supply line having a tangential direction, perpendicular to the radius as seen in a plane perpendicular to the axis of the settling chamber, for producing a whirlpool in said settling chamber, said whirlpool creating an additional driving force to the downward flow of separated sludge through the downer.

2. Reactor according to claim 1, intended for anaerobic water purification, wherein the supply line opening out tangentially into the settling chamber is a pipe for liquid and biogas.

3. Reactor according to claim 2, wherein the supply line is in communication with the fermentation chamber.

4. Reactor according to claim 1, intended for aerobic water purification, wherein the supply line opening out tangentially into the settling chamber is a pipe for liquid, and air or oxygen.

5. Reactor according to claim 1, wherein the means for discharging effluent from the settling chamber has a tangential inlet mouth positioned near the liquid level in the settling chamber.

6. Reactor according to claim 5, wherein the supply line opening out into the settling chamber is a pipe situated with its tangential outlet end in a space which is separated by a cylindrical partition from the tangential inlet mouth of the effluent discharge means.

7. Reactor according to claim 1, wherein the means for introducing effluent comprises at least one pipe opening out into a lower part of the downer and having a tangentially downwardly oriented outlet end.

8. Reactor according to claim 1, further comprising a number of gas inlet pipes disposed just above the bottom of the fermentation chamber.

9. Reactor according to claim 1, for anaerobic water purification, wherein the reactor is provided with a gas stripper comprising cascade chambers into which liquid/sludge mixture to be supplied to the settling chamber is introduced, and out of which the liquid/sludge mixture flows through a tangential outlet into the settling chamber.

10. Reactor according to claim 9, wherein the cascade chambers are provided in an annular space between a cylindrical wall of the reactor vessel and a cylindrical wall of the settling chamber.

11. Reactor according to claim 10, wherein the inside wall of the annular space comprises an opening for admitting effluent from the settling chamber into a chamber below the bottom of the first cascade chamber, said chamber being in communication with an effluent outlet, and said tangential outlet of the cascade chambers at said opening lying at an angular distance of little less than 360°, viewed in the whirlpool direction.

12. Reactor according to claim 9, further comprising a cyclone connected upstream of the cascade chambers, for separating coarse gas from the sludge/liquid mixture.

\* \* \* \* \*